United States Patent
Saeki

(10) Patent No.: US 10,641,943 B2
(45) Date of Patent: May 5, 2020

(54) DISPLAY DEVICE INCLUDING A LIGHT GUIDE PLATE HAVING A PLURALITY OF REFLECTING DOTS THAT FORM A DISPLAY PATTERN

(71) Applicant: STANLEY ELECTRIC CO., LTD., Meguro-ku, Tokyo (JP)

(72) Inventor: Yusuke Saeki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/436,032

(22) Filed: Jun. 10, 2019

(65) Prior Publication Data
US 2019/0383985 A1 Dec. 19, 2019

(30) Foreign Application Priority Data
Jun. 14, 2018 (JP) .................................. 2018-113499

(51) Int. Cl.
*F21V 8/00* (2006.01)
(52) U.S. Cl.
CPC ......... *G02B 6/0041* (2013.01); *G02B 6/0036* (2013.01); *G02B 6/0068* (2013.01)

(58) Field of Classification Search
CPC ... G02B 6/0041; G02B 6/0068; G02B 6/0036
See application file for complete search history.

(56) References Cited

FOREIGN PATENT DOCUMENTS

| JP | 2003519810 A | 6/2003 |
|---|---|---|
| JP | 2006075362 A | 3/2006 |
| JP | 2016118667 A | 6/2016 |
| WO | 0150444 A1 | 7/2001 |

*Primary Examiner* — Joseph L Williams
(74) *Attorney, Agent, or Firm* — Holtz, Holtz & Volek PC

(57) ABSTRACT

A display device includes a light guide plate that includes a plurality of reflecting dots; and a light source, wherein light emitted from the light source enters inside of the light guide plate from the end surface of the light guide plate and the light is guided inside of the light guiding plate, a display pattern formed by the plurality of reflecting dots is displayed by emitting the light reflected by the plurality of reflecting dots to an outside from a front surface side of the light guide plate, and each of the reflecting dots are formed such that a reflecting direction of the light, that is reflected by the reflecting dots, with respect to an incidence direction of the light, that enters the reflecting dots, is adjusted so that the light reflected by the plurality of reflecting dots is emitted toward a specific eye point of a viewer.

12 Claims, 8 Drawing Sheets

DISPLAY DEVICE INCLUDING A LIGHT GUIDE PLATE HAVING A PLURALITY OF REFLECTING DOTS THAT FORM A DISPLAY PATTERN

CROSS-REFERENCE TO RELATED APPLICATION

Priority is claimed on Japanese Patent Application No. 2018-113499, filed Jun. 14, 2018, the content of which is incorporated herein by reference.

BACKGROUND

Field of the Invention

The present invention relates to a display device.

Description of Related Art

For example, there is a display device including a light guide plate and a light source disposed along an end surface of the light guide plate, and configured to display a display pattern formed by a plurality of reflecting dots by causing light emitted from the light source to enter the light guide plate from the end surface of the light guide plate, guiding the light into the light guide plate and emitting the light reflected by the plurality of reflecting dots provided on a beck surface side of the light guide plate from a front surface side of the light guide plate to the outside (for example, see Japanese Unexamined Patent Application, First Publication No. 2016-118667, Published Japanese Translation No. 2003-519810 of the PCT International Publication, and Japanese Unexamined Patent Application, First Publication No. 2006-75362).

SUMMARY OF THE INVENTION

Incidentally, in the above-mentioned display device, when a plurality of display patterns are displayed on a surface of a light guide plate, an orientation of a plurality of reflecting dots (reflecting surfaces) that form display patterns is set so as to become a direction perpendicular to an incidence direction of the light according to the incidence direction of light from a light source corresponding to the display patterns. In addition, an emission direction of light reflected by the reflecting dots (reflecting surfaces) is controlled such that it becomes a direction orthogonal to a front surface of the light guide plate.

However, in the display device in the related art, it is difficult to visually recognize a display pattern of a region out of a viewer's eye point (positions of left and right pupils). That is, the display pattern displayed on the front surface side of the light guide plate is displayed by the light reflected by the reflecting dots (reflecting surfaces) being emitted toward directly above the display pattern. For this reason, it is difficult to visually recognize the display pattern of the region out of the viewer's eye point.

Accordingly, in the display device in the related art, it is difficult to visually recognize a larger display pattern than an eye width of the viewer without changing the eye point. In addition, in the display device in the related art, it is difficult to visually recognize a plurality of display patterns at positions away from the eye width of the viewer without changing the eye point.

An aspect of the present invention is directed to providing a display device in which visibility of a display pattern visually recognized at a specific eye point is improved.

In order to accomplish the above-mentioned objects, the present invention provides the following means.

[1] A display device including: a light guide plate that includes a plurality of reflecting dots; and a light source disposed along an end surface of the light guide plate, wherein light emitted from the light source enters inside of the light guide plate from the end surface of the light guide plate and the light is guided inside of the light guiding plate, a display pattern formed by the plurality of reflecting dots is displayed by emitting the light reflected by the plurality of reflecting dots to an outside from a front surface side of the light guide plate, and each of the reflecting dots are provided at a back surface side of the light guide plate and are formed such that a reflecting direction of the light, that is reflected by the reflecting dots, with respect to an incidence direction of the light, that enters the reflecting dots, is adjusted so that the light reflected by the plurality of reflecting dots is emitted toward a specific eye point at which the display pattern is visually recognized by a viewer.

[2] The display device according to [1], including:

a first reflecting dot group constituted by the plurality of reflecting dots that form a first display pattern;

a second reflecting dot group constituted by the plurality of reflecting dots that form a second display pattern;

a first light source configured to emit first light toward the first reflecting dot group; and a second light source configured to emit second light toward the second reflecting dot group, wherein the first light reflected by the plurality of reflecting dots that constitute the first reflecting dot group is emitted toward the eye point, and the second light reflected by the plurality of reflecting dots that constitute the second reflecting dot group is emitted toward the eye point.

[3] The display device according to [2], wherein the second light reflected by the plurality of reflecting dots that constitute the first reflecting dot group is emitted toward a position different from the eye point, and the first light reflected by the plurality of reflecting dots that constitute the second reflecting dot group is emitted toward a position different from the eye point.

[4] The display device according to [2] or [3], wherein a first pattern forming region that forms the first display pattern and a second pattern forming region that forms the second display pattern at least partially overlap each other in a surface of the light guide plate.

[5] The display device according to [4], including a composite dot in which end portions of the first reflecting dot and the second reflecting dot, which are adjacent to each other, butt against each other, among the plurality of reflecting dots that constitute the first reflecting dot group and the plurality of reflecting dots that constitute the second reflecting dot group in a region in which the first pattern forming region and the second pattern forming region overlap each other.

[6] The display device according to any one of [1] to [5], wherein colored lights of the first light and the second light are different from each other.

[7] The display device according to any one of [1] to [6], wherein the plurality of reflecting dots have reflecting surfaces configured to reflect light from the light source, and an orientation of the reflecting surfaces in the surface of the light guide plate is set at each of the reflecting dots such that the light reflected by the plurality of reflecting dots is emitted toward the eye point.

[8] The display device according to [7], wherein the reflecting surfaces have a shape extending in a direction crossing an incidence direction of the light entering the reflecting surfaces when the light guide plate is seen from a front surface side in a plan view.

[9] The display device according to [8], wherein the reflecting surfaces have a shape curved toward a side in which light from the light source enters the reflecting surfaces when the light guide plate is seen from the front surface side in a plan view.

[10] The display device according to [8] or [9], wherein the reflecting dot is constituted by a concave section provided in a back surface of the light guide plate, and the concave section includes an inclined surface that forms the reflecting surface.

[11] The display device according to any one of [1] to [10], wherein the light source comprises a plurality of light emitting elements configured to emit different colored lights.

[12] The display device according to [11], wherein the light source mixes and emits different colored lights emitted from the plurality of light emitting elements.

As described above, according to the aspect of the present invention, it is possible to provide a display device capable of improving visibility of a display pattern visually recognized at a specific eye point.

MODES FOR CARRYING OUT THE INVENTION

Figure 1:
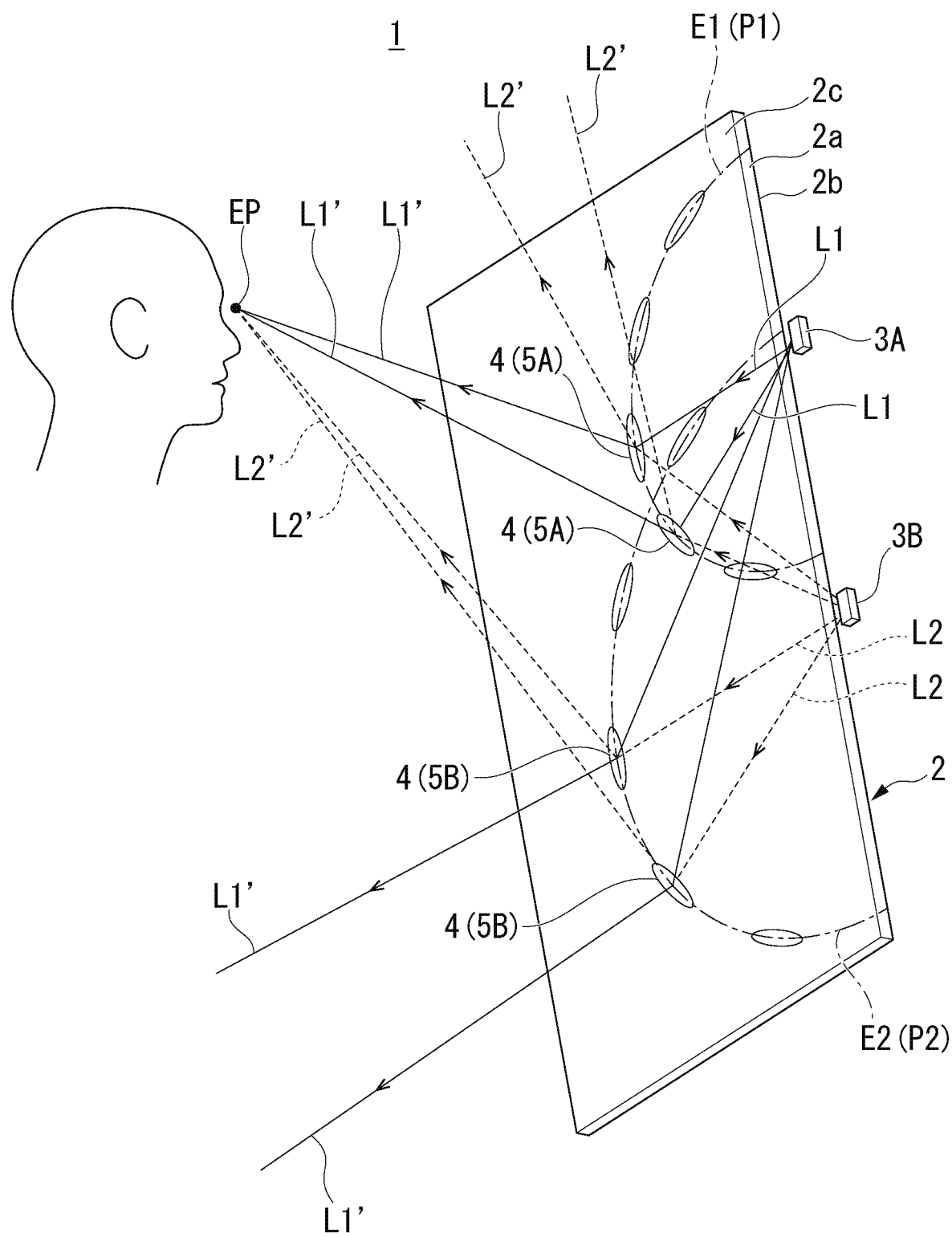
FIG. 1 is a perspective view showing a schematic configuration of a display device according to a first embodiment of the present invention.

Hereinafter, embodiments of the present invention will be described in detail with reference to the accompanying drawings.

Further, in the drawings used in the following description, in order to make components easier to see, the scale of the dimensions may be shown differently depending on components, and dimensional ratios between the components are not necessarily the same as actual ones.

First Embodiment

For example, a display device 1 shown in FIG. 1 will be described as a first embodiment of the present invention.

Further, FIG. 1 is a perspective view showing a schematic configuration of the display device 1.

As shown in FIG. 1, the display device 1 of the embodiment includes a light guide plate 2, and a plurality of (in the embodiment, two) light sources 3A and 3B.

The light guide plate 2 is formed of a material having a higher refractive index than air, such as for example, a transparent resin such as acryl, polycarbonate, or the like, or glass, or the like, and is formed in a substantially rectangular flat plate shape as a whole. Further, a shape of the light guide plate 2 when seen in a plan view is not limited to the above-mentioned rectangular shape and may be a polygonal shape.

The plurality of light sources 3A and 3B are constituted by light emitting elements such as light emitting diodes (LEDs) or the like, and disposed along an end surface 2a of the light guide plate 2.

The display device 1 displays a plurality of (in the embodiment, two) display patterns P1 and P2 formed by the plurality of reflecting dots 4 by causing lights L1 and L2 emitted from the light sources 3A and 3B to enter the light guide plate 2 from the end surface 2a of the light guide plate 2, guiding the lights L1 and L2 while repeating reflection in the light guide plate 2, and emitting the light reflected by a plurality of reflecting dots 4 provided on a back surface 2b side of the light guide plate 2 to the outside from a front surface 2c side of the light guide plate 2.

Specifically, on the back surface 2b of the light guide plate 2, a first reflecting dot group (one reflecting dot group) 5A constituted by the plurality of reflecting dots 4 that form a first display pattern (for example, one display pattern) P1 among the plurality of display patterns P1 and P2, and a second reflecting dot group (the other reflecting dot group) 5B constituted by the plurality of reflecting dots 4 that form the second display pattern (for example, the other display pattern) P2 are provided.

In addition, in the plurality of light sources 3A and 3B, the first light source (one light source) 3A emits first light (one light) L1 toward the first reflecting dot group 5A, and the second light source (the other light source) 3B emits second light (the other light) L2 toward the second reflecting dot group 5B.

Further, in a surface of the light guide plate 2, a first pattern forming region (one display forming region) E1 that forms the first display pattern P1 and a second pattern forming region (the other display forming region) E2 that forms the second display pattern P2 partially overlap each other.

In the first embodiment, colored lights of the first light L1 and the second light L2 that display the first display pattern P1 and the second display pattern P2 are different from each other. Meanwhile, the colored lights of the first light L1 and the second light L2 are not limited to the case in which they are different from each other and they may be the same as each other.

In addition, the first display pattern P1 and the second display pattern P2 may be displayed simultaneously or may be displayed separately.

Figure 2A:
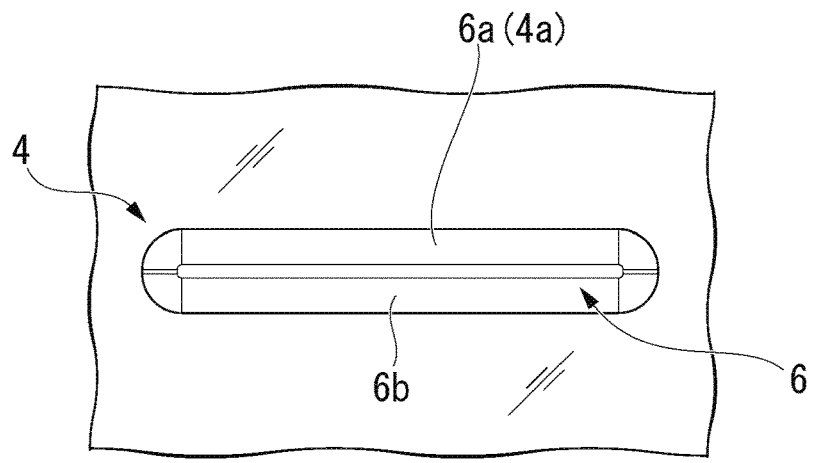
FIG. 2A is a plan view showing a configuration of reflecting dots provided on a light guide plate included in the display device shown in FIG. 1.
Figure 2B:
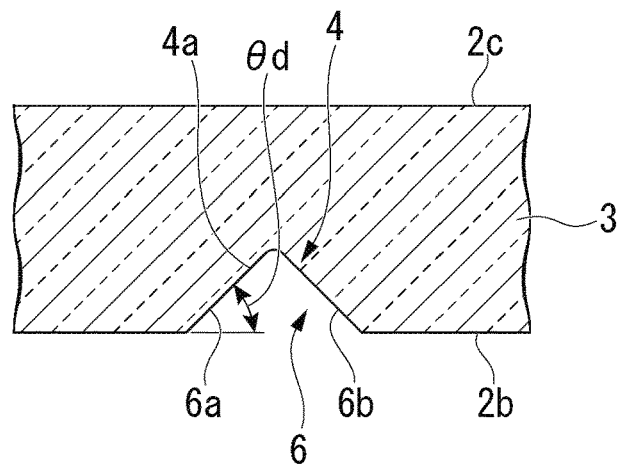
FIG. 2B is a cross-sectional view showing a configuration of the reflecting dots provided on the light guide plate included in the display device shown in FIG. 1.

The reflecting dots 4 have a configuration as shown in, for example, FIGS. 2(A) and 2(B). Further, FIG. 2(A) is a plan view showing a configuration of the reflecting dots 4. FIG. 2(B) is a cross-sectional view showing a configuration of the reflecting dots 4.

Specifically, the reflecting dot 4 is constituted by a concave section 6 provided in the back surface 2b of the light guide plate 2. The concave section 6 has a pair of inclined surfaces 6a and 6b inclined in opposite directions, and has a form in which the two end portions of the pair of inclined surfaces 6a and 6b in a longitudinal direction abut each other.

Further, while both end portions of the reflecting dots 4 have a rounded shape when seen in a plan view, it is more preferable so that they have a pointed shape when seen in a plan view. In addition, a bottom section of the concave section 6 in which the pair of inclined surfaces 6a and 6b abut against each other also has a rounded shape when seen in a cross-sectional view, it is more preferable so that the bottom section have a pointed shape when seen in a cross-sectional view.

Further, the light guide plate 2 has a sufficient thickness (about several mm) to cause the lights L1 and L2 emitted from the light sources 3A and 3B to enter from the end surface 2a. On the other hand, the concave section 6 has a length of about several tens of μm to several hundreds of μm (for example, 20 to 250 μm) with a depth of about several μm to several tens of μm.

Among these, one inclined surface (in the embodiment, the inclined surface 6a) forms the reflecting surfaces 4a that reflects the first light L1 (or the second light L2) from the first light source 3A (or the second light source 3B). That is, each of the reflecting dots 4 has the reflecting surface 4a that reflects the lights L1 and L2 from the light sources 3A and 3B corresponding to each of the display patterns P1 and P2 (the reflecting dot groups 5A and 5B), respectively.

In the first embodiment, the reflecting surfaces 4a have a shape extending in a direction crossing the incidence direction of the lights L1 and L2 entering the reflecting surfaces 4a when the light guide plate 2 is seen from the front surface 2c side in a plan view. In addition, the reflecting surfaces 4a are inclined at a constant angle (for example, 45°) with respect to an in-plane direction of the light guide plate 2 (or a direction parallel to the back surface 2b) (hereinafter, the angle is referred to as a reflecting angle θd).

In the display device 1 of the embodiment, light quantities (luminance) of lights L1' and L2' reflected by the reflecting dots 4 (the reflecting surfaces 4a) can be adjusted according to lengths of the reflecting dots 4 (the reflecting surfaces 4a). That is, the light quantities (luminance) of the lights L1' and L2' reflected by the reflecting dots 4 (the reflecting surfaces 4a) can be reduced by shortening the reflecting dots 4 (the reflecting surfaces 4a). Meanwhile, the light quantities (luminance) of the lights L1' and L2' reflected by the reflecting dots 4 (the reflecting surfaces 4a) can be increased by lengthening the reflecting dots 4 (the reflecting surfaces 4a).

Further, in the embodiment, from a viewpoint of manufacture of the reflecting dots 4 (the concave sections 6), depths of the concave sections 6 that constitute the reflecting dots 4 and angles of the inclined surfaces 6a and 6b are made constant (common). Meanwhile, light quantities (luminance) of the lights L1' and L2' reflected by the reflecting dots 4 can be adjusted or a light distribution of the lights L1' and L2' can be adjusted by changing depths and shapes of the concave sections 6.

Figure 3:
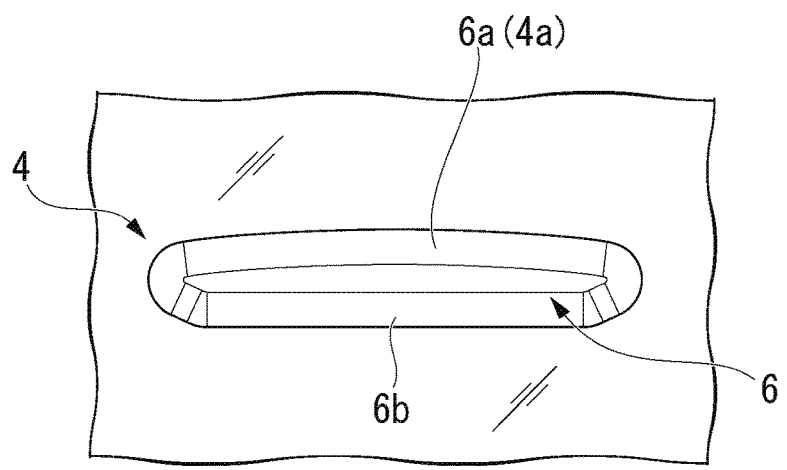
FIG. 3 is a plan view showing another configuration of the reflecting dots.

In addition, in the reflecting dot 4, for example, a configuration having the reflecting surface 4a as shown in FIG. 3 may be provided. Further, FIG. 3 is a plan view showing another configuration of the reflecting dot 4.

The reflecting dot 4 shown in FIG. 3 has the reflecting surface 4a having a convex shape curved toward a side into which the lights L1 and L2 from the light sources 3A and 3R enter when the light guide plate 2 is seen from the front surface side in a plan view. In the case of the configuration, the lights L1 and L2 entering the reflecting surfaces 4a can be reflected while being diffused. In addition, the reflecting surface 4a may have a curved concave shape. Also in this case, the lights L1 and L2 entering the reflecting surfaces 4a can be reflected and diffused.

Incidentally, in the display device 1 of the embodiment, as shown in FIG. 1, reflecting directions of the lights L1' and L2' reflected by the reflecting dots 4 with respect to the incidence directions of the lights L1 and L2 entering the reflecting dots 4 are controlled such that the lights L1' and L2' reflected by the plurality of reflecting dots 4 are emitted toward specific eye point (for example, positions of the pupil of the viewer) EP of a viewer who visually recognizes the display patterns P1 and P2. That is, in the display device 1 of the embodiment, as shown in FIG. 1, each of the reflecting dots are formed such that reflecting directions of the lights L1' and L2' reflected by the reflecting dots 4 with respect to the incidence directions of the lights L1 and L2 entering the reflecting dots 4 are adjusted so that the lights L1' and L2' reflected by the plurality of reflecting dots 4 are emitted toward specific eye point (for example, positions of the pupil of the viewer) EP of a viewer who visually recognizes the display patterns P1 and P2.

That is, in the display device 1 of the embodiment, orientations of the reflecting surfaces 4a in the surface of the light guide plate 2 are set for every reflecting dot 4 such that the lights L1' and L2' reflected by each of the plurality of reflecting dots 4 are emitted toward the eye point EP.

Accordingly, the first light L1' reflected by the plurality of reflecting dots 4 that constitute the first reflecting dot group 5A is emitted toward the eye point EP. In addition, the second light L2' reflected by the plurality of reflecting dots 4 that constitute the second reflecting dot group 5B is emitted toward the eye point EP.

Meanwhile, the second light L2' reflected by the plurality of reflecting dots 4 that constitute the first reflecting dot group 5A is emitted toward a position different from the eye point EP. In addition, the first light L1' reflected by the plurality of reflecting dots 4 that constitute the second reflecting dot group 5B is emitted toward a position different from the eye point EP.

Here, a relation between the incidence direction of the first light L1 and the emission direction of the first light L1' with respect to the reflecting surfaces 4a and the eye point EP will be described with reference to FIG. 4.

Figure 4:
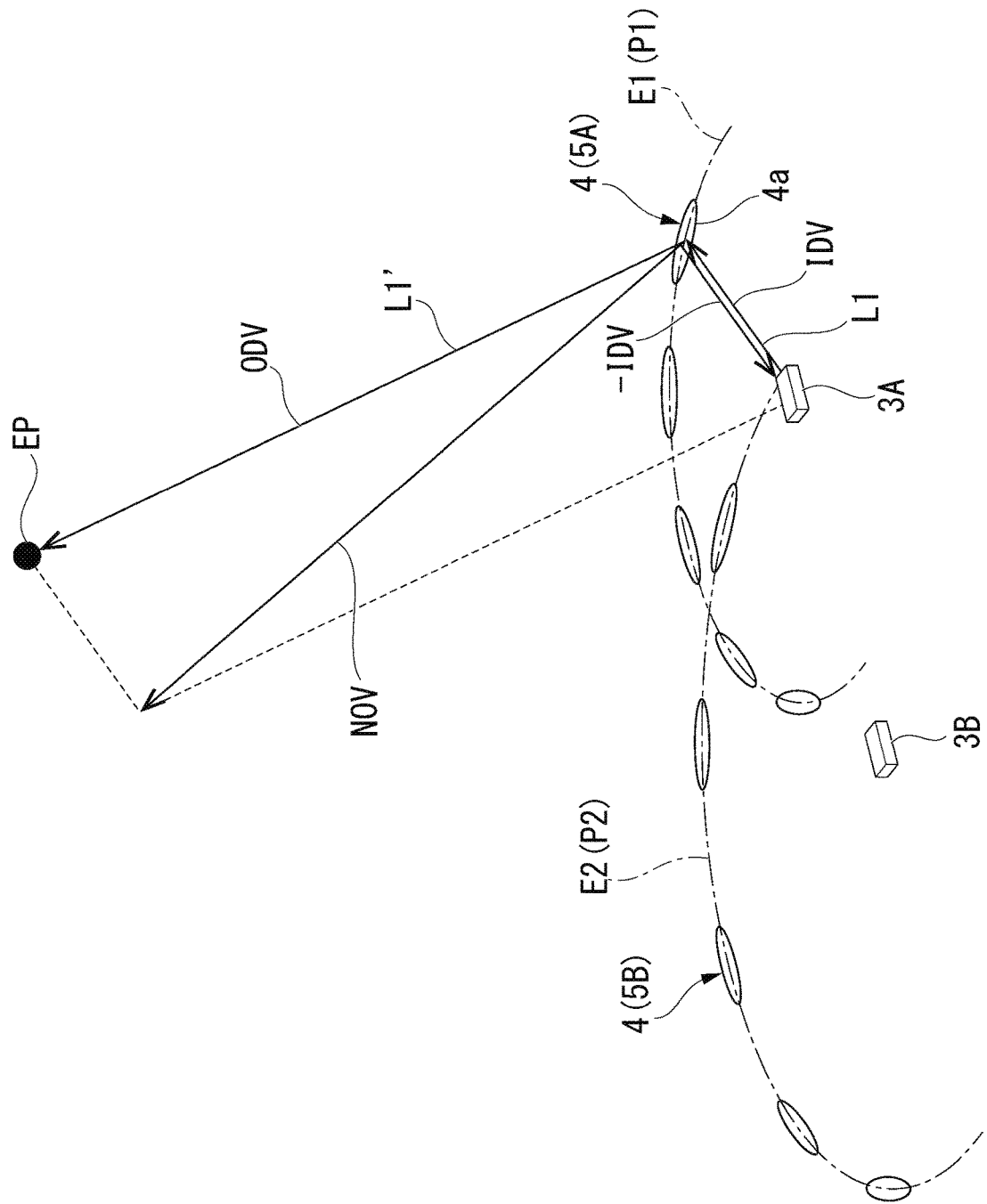
FIG. 4 is a perspective view for explaining a relation between an incidence direction and an emission direction of light with respect to reflecting surfaces, and eye point.

Further, FIG. 4 is a perspective view for explaining a relation between the incidence direction of the first light L1 and the emission direction of the first light L1' with respect to the reflecting surfaces 4a and the eye point EP.

In addition, since a relation between the incidence direction of the second light L2 and the emission direction of the second light L2' with respect to the reflecting surfaces 4a and the eye point EP is the same as the relation between the incidence direction of the first light L1 and the emission direction of the first light L1' with respect to the reflecting surfaces 4a and the eye point EP, description thereof will be omitted.

In the display device 1 of the embodiment, as shown in FIG. 4, provided that a direction component of the first light L1 that is directed from the first light source 3A to the reflecting surface 4a of the reflecting dot 4 is referred to as "an incidence direction vector IDV" and a reverse vector thereof is referred to as "an anti-incidence direction vector −IDV," a direction component of the first light L1' that is directed from the reflecting surface 4a to the eye point EP is referred to as "an emission direction vector ODV" and a direction component perpendicular to the reflecting surface 4a is referred to as "a normal vector NOV," an orientation of the reflecting surface 4a of the reflecting dot 4 in the surface of the light guide plate 2 is set such that a composite vector of the anti-incidence direction vector −IDV and the emission direction vector ODV coincides with the normal vector NOV.

Accordingly, in the display device 1 of the embodiment, the first light L1 reflected by the reflecting surfaces 4a of the reflecting dots 4 can be emitted toward the eye point EP.

However, when the above-mentioned reflecting angle θd of the reflecting surface 4a is made constant (45°), it is difficult to make the composite vector of the anti-incidence direction vector −IDV and the emission direction vector ODV to coincide with the normal vector NOV.

Here, regarding the orientation of each of the reflecting surfaces 4a of the reflecting dots 4 in the surface of the light guide plate 2, there is a need to make the above-mentioned composite vector approach the normal vector NOV. The specific adjusting method will be described with reference to FIGS. 5A and 5B and FIGS. 6A and 6B.

Figure 5A:
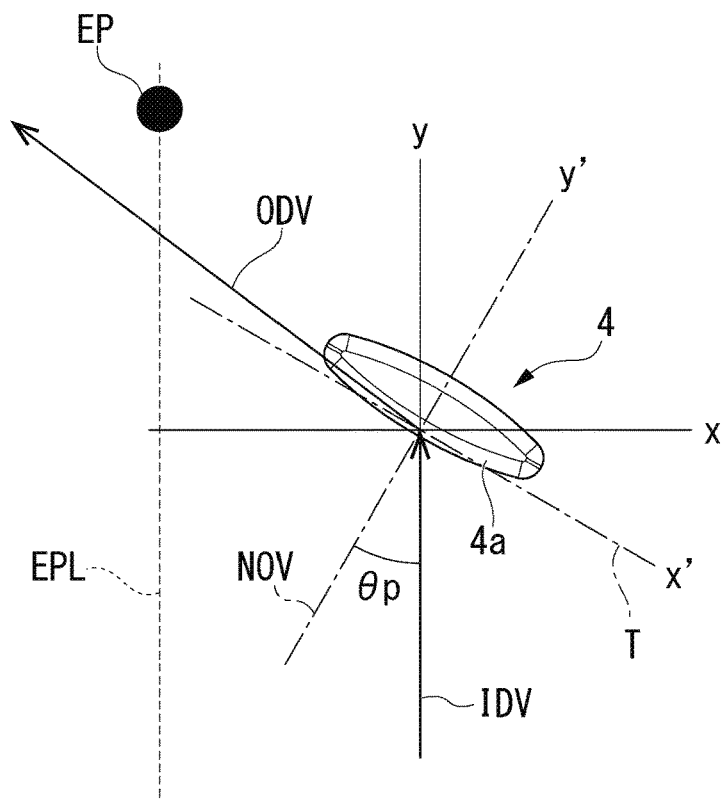
FIG. 5A is a plan view showing one example of an orientation of the reflecting surface when a reflecting angle of the reflecting surface is smaller than an ideal reflecting angle and a state before correction thereof.
Figure 5B:
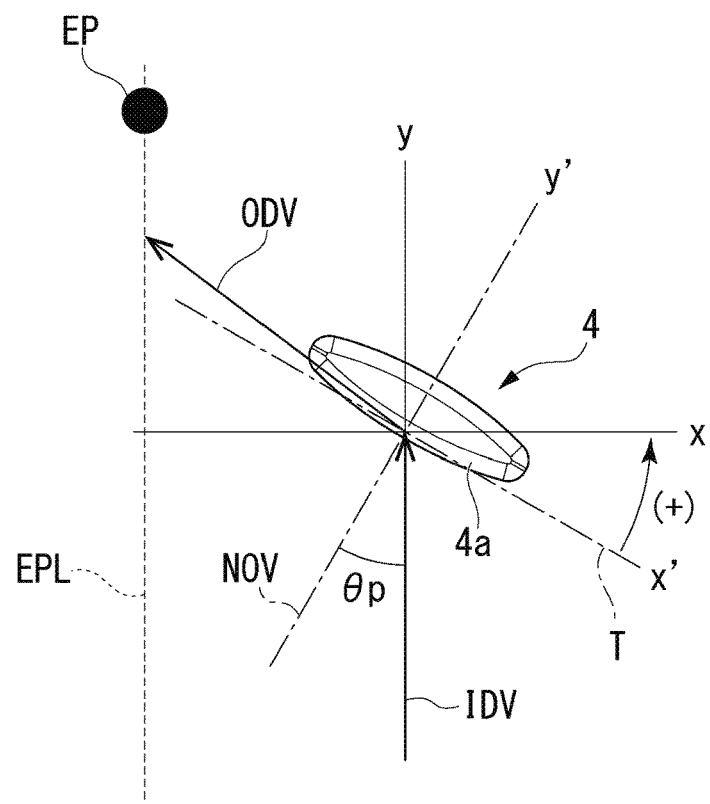
FIG. 5B is a plan view showing the one example of an orientation of the reflecting surface when the reflecting angle of the reflecting surface is smaller than the ideal reflecting angle and a state after the correction.
Figure 6A:
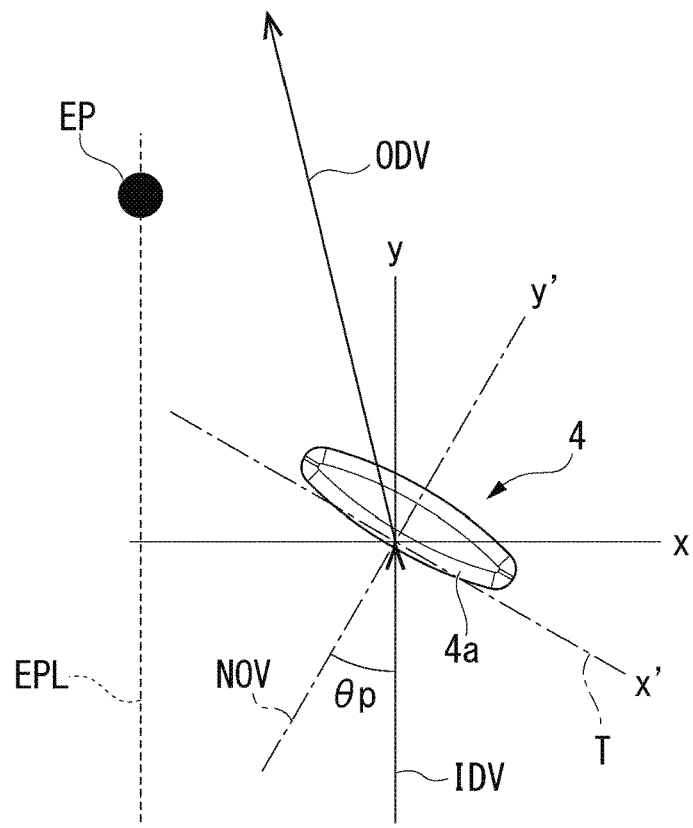
FIG. 6A is a plan view showing one example of an orientation of the reflecting surface when the reflecting angle of the reflecting surface is larger than the ideal reflecting angle and a state before correction thereof.
Figure 6B:
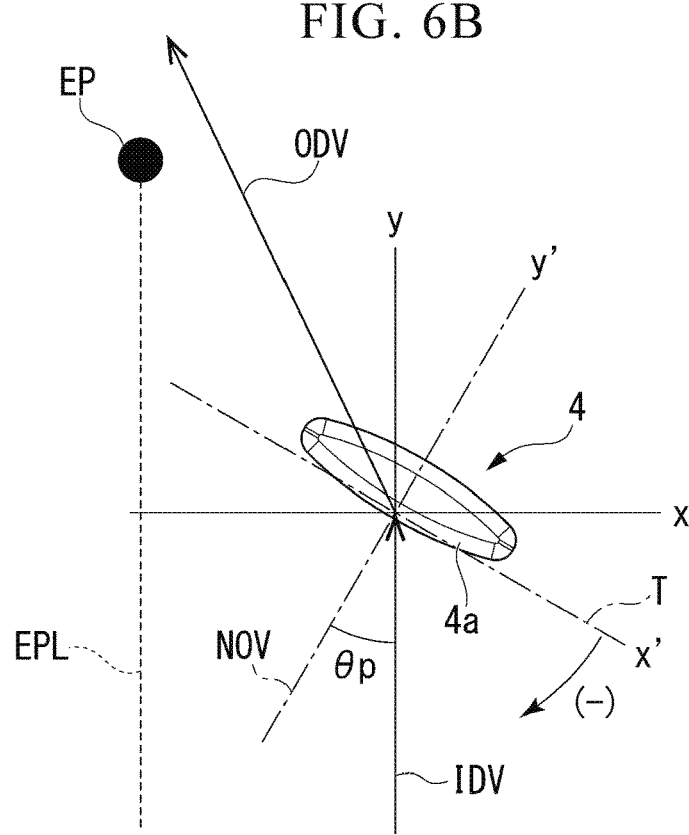
FIG. 6B is a plan view showing the one example of an orientation of the reflecting surface when the reflecting angle of the reflecting surface is larger than the ideal reflecting angle and a state after the correction.

Further, FIG. 5A is a plan view showing one example of an orientation of the reflecting surface 4a when the reflecting angle θd of the reflecting surface 4a is smaller than an ideal reflecting angle θn (θn>θd), and a state before correction thereof, and FIG. 5B is a plan view showing the one example of an orientation of the reflecting surface 4a when the reflecting angle θd of the reflecting surface 4a is smaller than the ideal reflecting angle θn (θn >θd), and a state after the correction. FIG. 6A is a plan view showing one example of an orientation of the reflecting surface 4a when the reflecting angle θd of the reflecting surface 4a is larger than the ideal reflecting angle θn (θn<θd), and a state before correction thereof, and FIG. 6B is a plan view showing one example of an orientation of the reflecting surface 4a when the reflecting angle θd of the reflecting surface 4a is larger than the ideal reflecting angle θn (θn<θd), and a state after the correction.

In FIGS. 5A and 5B and FIGS. 6A and 6B, XY coordinates in a central section of the reflecting surfaces 4a are set, and the incidence direction vector IDV coincides with a Y axis. In addition, when X'Y' coordinates in which a tangential line T in contact with the central section of the reflecting surfaces 4a is referred to as an X' axis and a direction perpendicular to the tangential line T is referred to as a Y' axis are set, the normal vector NOV coincides with the Y' axis. Further, an angle of the normal vector NOV (the Y' axis) with respect to the incidence direction vector IDV (the Y axis) is referred to as "a disposition angle θp" of the reflecting surfaces 4a, an ideal reflecting angle of the emission direction vector ODV directed toward the eye point EP is referred to as "the ideal reflecting angle θn" and a line parallel to the Y axis passing through the eye point EP is referred to as "an eye point line EPL."

When the reflecting angle θd is constant (45°), there is a need to adjust the disposition angle θp of the reflecting surfaces 4a so as to approach the ideal reflecting angle θn calculated from the normal vector NOV.

Specifically, as shown in FIG. 5A, when the reflecting angle θd is smaller than the ideal reflecting angle θn (θn>θd), an orientation of the reflecting surfaces 4a is adjusted about center coordinates (X, Y)=(0, 0) of the reflecting surfaces 4a in a positive (+) direction in which the disposition angle θp is reduced. Accordingly, as shown in FIG. 5B, it is possible to make the emission direction vector ODV approach closer to the eye point line EPL.

On the other hand, as shown in FIG. 6A, when the reflecting angle θd is larger than the ideal reflecting angle θn (θn<θd), an orientation of the reflecting surfaces 4a is adjusted about the center coordinates (X, Y)=(0, 0) of the reflecting surfaces 4a in a negative (−) direction in which the disposition angle θp is increased. Accordingly, as shown in FIG. 6B, it is possible to make the emission direction vector ODV approach closer to the eye point line EPL.

In addition, specific numerical values for making the emission direction vector ODV to approach the eye point line EPL are shown in the following Table 1. Further, coordinates ($x_p$, $y_p$) shown in Table 1 represents a central position of the reflecting surfaces 4a of the reflecting dots 4 when the light guide plate 2 is seen from the front surface 2c side in a plan view. In addition, an $x_p$ axis is an axis parallel to the end surface 2a on an incidence side when the light guide plate 2 is seen from the front surface 2c side in a plan view, and a $y_p$ axis is an axis perpendicular to the $x_p$ axis.

TABLE 1

| $x_P$ | $y_P$ | θp[deg] | θn[deg] | θd[deg] | θn − θd[deg] | ADJUSTMENT DIRECTION OF DISPOSITION ANGLE (θp) |
|---|---|---|---|---|---|---|
| 28.3 | −19.9 | 73.48063 | 45.1842 | 45 | 0.18420428 | ADJUSTMENT TOWARD |
| 28.4 | −19.8 | 73.53755 | 45.1866 | 45 | 0.18660057 | POSITIVE (+) DIRECTION |
| 32.8 | −38.8 | 70.9639 | 44.63179 | 45 | −0.36821225 | ADJUSTMENT TOWARD |
| 32.9 | −38.9 | 71.09557 | 44.62852 | 45 | −0.37147379 | NEGATIVE (−) DIRECTION |

For example, when the coordinates ($x_p$, $y_p$) are (28.3, −19.9), a difference (θn−θd) between the ideal reflecting angle θn and the reflecting angle θd is 0.18420428. In this case, since the ideal reflecting angle θn is positive (+) with respect to the reflecting angle θd, an orientation of the reflecting surface 4a is adjusted in the positive (+) direction in which the disposition angle θp is reduced. Accordingly, it is possible to adjust the emission direction vector ODV so as to approach the eye point line EPL.

Meanwhile, when the coordinates $(x_p, y_p)$ are (32.8, −38.8), a difference (θn−θd) between the ideal reflecting angle θn and the reflecting angle θd is −0.36821225. In this case, since the ideal reflecting angle θn is negative (−) with respect to the reflecting angle θd, an orientation of the reflecting surface 4a is adjusted in a negative (−) direction in which the disposition angle θp is increased. Accordingly, it is possible to adjust the emission direction vector ODV so as to approach the eye point line EPL.

Further, in the case of the composite dot that will be described below, since the end portions of the one reflecting dots and the other reflecting dots, which are adjacent to each other, abut against each other to constitute the composite dots, it is preferable to perform further positional adjustment on an $x_p y_p$ plane of the reflecting surfaces 4a in consideration of the reflection rate.

As described above, in the display device 1 in the embodiment, a light distribution of the lights L1' and L2' reflected at each of the reflecting surface 4a of the reflecting dots 4 can be accurately controlled. That is, in the display device 1 in the embodiment, each of the reflecting surface 4a of the reflecting dots 4 are formed so that the lights L1' and L2' reflected at each of the reflecting surface 4a of the reflecting dots 4 are distributed to the eye point EP with high accuracy.

Further, in the embodiment, while the case in which the reflecting angle θd is constant (45°) has been exemplified in a viewpoint of manufacture of the reflecting dot 4 (the concave section 6), in order to coincide the composite vector of the anti-incidence direction vector −IDV and the emission direction vector ODV with the normal vector NOV, a configuration in which the reflecting angle θd is adjusted such that the reflecting angle θd becomes the ideal reflecting angle θn may be provided in addition to the adjustment of the orientation of the reflecting surface 4a (the disposition angle θp). In addition, in real design of the reflecting dot 4 (the concave section 6), a refractive index upon incidence and emission with respect to the light guide plate 2 needs to be considered.

In addition, in the embodiment, while the eye point EP are schematically shown as a point, actually, a range that can be visually recognized by a viewer at a specific position in accordance with the eye width (for example, 65 mm) of the viewer may be defined as the eye point EP.

In addition, in the display device 1 of the embodiment, within a range in which radiation angles of the lights L1 and L2 radially emitted from the light sources 3A and 3B are maximally 60° to 120° (preferably, 60°), it is preferable to dispose each of the reflecting dot 4 such that the lights L1 and L2 enter the plurality of reflecting dots 4 corresponding to the light sources 3A and 3B.

As described above, in the display device of the embodiment, reflecting directions of the lights L1' and L2', that are reflected by each of the reflecting dots 4 (the reflecting surface 4a), with respect to the incidence directions of the lights L1 and L2, that enters each of the reflecting dot 4 (the reflecting surface 4a), are controlled such that the lights L1' and L2' reflected by the plurality of reflecting dots 4 that constitute the reflecting dot groups 5A and 5B are emitted toward the specific eye point EP at which each of the display patterns P1 and P2 are able to be visually recognized. That is, in the display device of the embodiment, each of the reflecting dots 4 (the reflecting surface 4a) are formed such that reflecting directions of the lights L1' and L2', that are reflected by each of the reflecting dots 4 (the reflecting surface 4a), with respect to the incidence directions of the lights L1 and L2, that enters each of the reflecting dot 4 (the reflecting surface 4a), are adjusted so that the lights L1' and L2' reflected by the plurality of reflecting dots 4 that constitute the reflecting dot groups 5A and 5B are emitted toward the specific eye point EP at which each of the display patterns P1 and P2 are able to be visually recognized.

Accordingly, visibility of the first display pattern P1 and the second display pattern P2 visually recognized at the specific eye point EP can be improved. In addition, it is possible to visually recognize the display patterns P1 and P2 larger than the eye width of the viewer or the plurality of display patterns P1 and P2 disposed at positions away from the eye width of the viewer without changing the eye point EP.

In addition, in the display device of the embodiment, also when the first pattern forming region E1 and the second pattern forming region E2 at least partially overlap each other, the light distribution of the lights L1' and L2' reflected at each of the reflecting surface 4a of the reflecting dots 4 can be accurately controlled for each of the pattern forming regions E1 and E2. Accordingly, also in this case, visibility of the first display pattern P1 and the second display pattern P2 visually recognized at the specific eye point EP can be improved.

Figure 7:
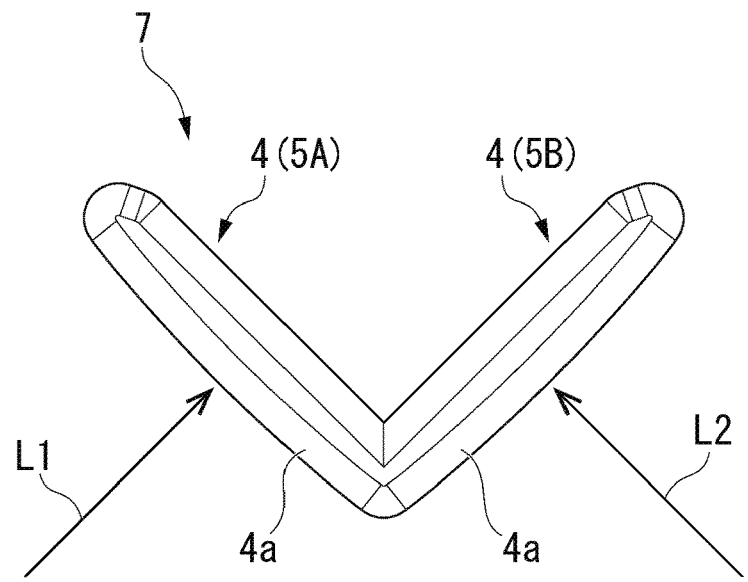
FIG. 7 is a plan view showing a configuration of a composite dot.

In addition, in the display device of the embodiment, in the region in which the first pattern forming region E1 and the second pattern forming region E2 overlap each other, for example, a configuration including a composite dot 7 as shown in FIG. 7 may be provided. Further, FIG. 8 is a plan view showing a configuration of the composite dot 7.

The composite dot 7 has a configuration in which end portions of the first reflecting dot (one reflecting dot) 4 and the second reflecting dot (the other reflecting dot) 4, which are adjacent to each other, among the plurality of reflecting dots 4 that constitute the first reflecting dot group 5A and the plurality of reflecting dots 4 that constitute the second reflecting dot group 5B abut against each other. Among these, the first reflecting dot 4 that constitute the first reflecting dot group 5A is disposed in a state in which the reflecting surface 4a is directed in a direction in which the first light L1 from the first light source 3A enters. Meanwhile, the second reflecting dot 4 that constitute the second reflecting dot group 5B is disposed in a state in which the reflecting surface 4a is directed in a direction in which the second light L2 from the second light source 3B enters.

Accordingly, also when the first pattern forming region E1 and the second pattern forming region E2 overlap each other, the first reflecting dot 4 and the second reflecting dot 4, which are adjacent to each other, can be efficiently disposed in an appropriate orientation by disposing the composite dot 7 in the overlapping region.

Figure 8:
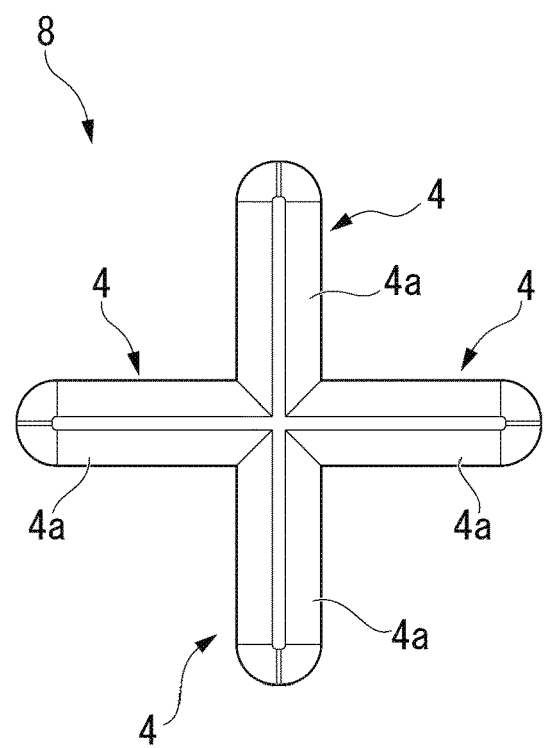
FIG. 8 is a plan view showing another configuration of the composite dot.

Further, the composite dot 7 is not particularly limited to the configuration shown in FIG. 7, and for example, a composite dot 8 as shown in FIG. 8 can also be disposed. Further, FIG. 8 is a plan view showing a configuration of the composite dot 8.

Among these, the composite dot 8 shown in FIG. 8 has a configuration in which the end portions of the neighboring four reflecting dots 4 abut against each other. In addition, the four reflecting dots 4 are disposed in a state in which the reflecting surfaces 4a are directed in a direction in which light from the corresponding light sources (not shown) enters, respectively. In this way, even when the number of neighboring reflecting dots 4 is increased, the reflecting dots 4 can be efficiently disposed in an appropriate orientation by causing the end portions of the one reflecting dot 4 and the other reflecting dot 4, which are adjacent to each other, to abut against each other.

Further, in the neighboring reflecting dots 4, the end portions of the one reflecting dot 4 and the other reflecting dot 4, which are adjacent to each other, do not necessarily have to be abutting composite dots, and mutual interference can be prevented by shifting the disposition (pitch) of the one reflecting dot 4 and the other reflecting dot 4.

Second Embodiment

Next, as a second embodiment of the present invention, a display device 1A shown in FIG. 9 will be described.

Figure 9:
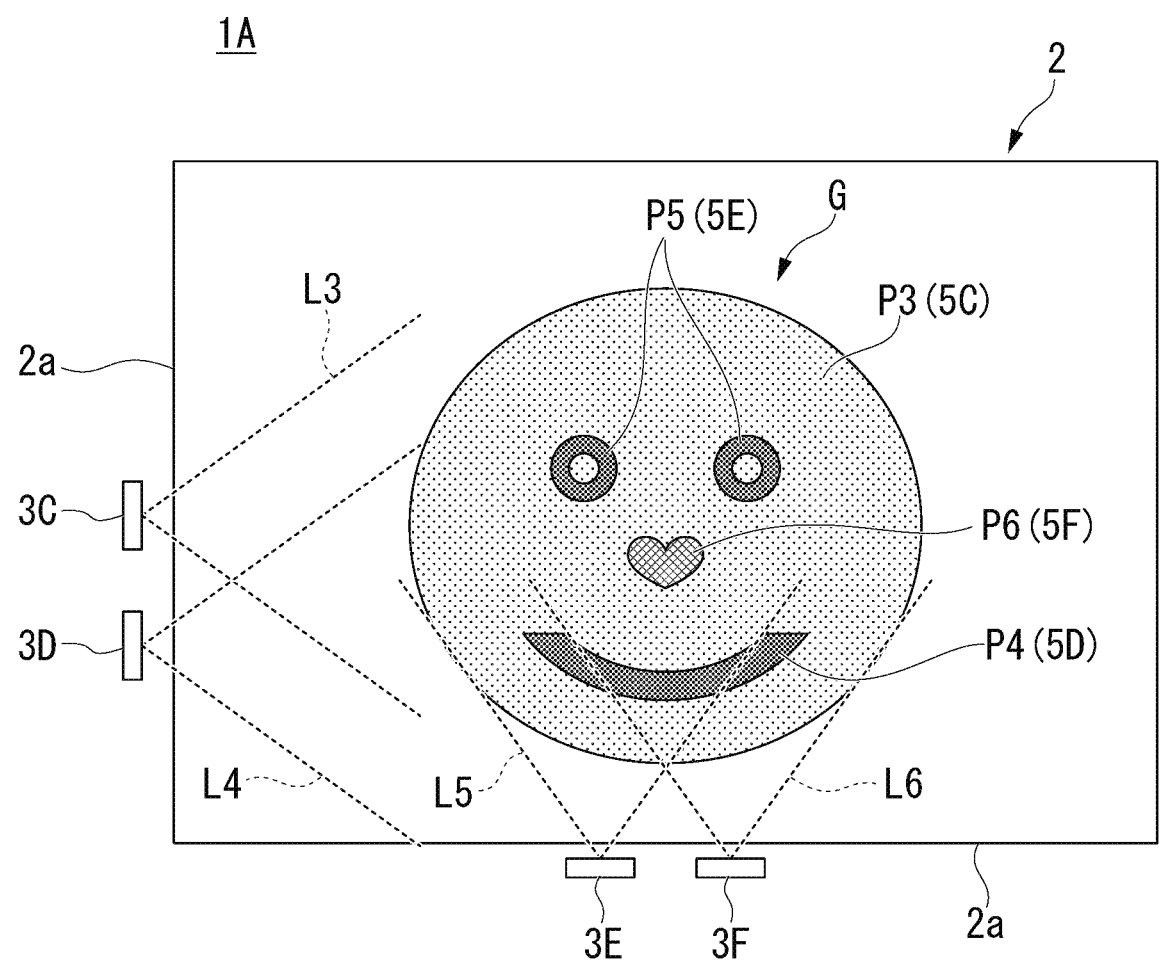
FIG. 9 is a plan view showing a configuration of a display device according to a second embodiment of the present invention.

Further, FIG. 9 is a plan view showing a configuration of the display device 1A. In addition, in the following description, the same components as those of the display device 1 are designated by the same reference numerals in the drawings and description thereof will be omitted.

As shown in FIG. 9, the display device 1A of the embodiment displays one image G by overlapping four display patterns P3, P4, P5 and P6 in the surface of the light guide plate 2.

Specifically, a first reflecting dot group 5C constituted by the plurality of reflecting dots 4 (not shown in FIG. 9) that form the first display pattern P3, a second reflecting dot group 5D constituted by the plurality of reflecting dots 4 (not shown in FIG. 9) that form the second display pattern P4, a third reflecting dot group 5E constituted by the plurality of reflecting dots 4 (not shown in FIG. 9) that form the third display pattern P5, and a fourth reflecting dot group 5F constituted by the plurality of reflecting dots 4 (not shown in FIG. 9) that form fourth display pattern P6 are provided on the back surface 2b of the light guide plate 2.

In addition, the display device 1A includes a first light source 3C configured to emit first light L3 toward the first reflecting dot group 5C, a second light source 3D configured to emit second light L4 toward the second reflecting dot group 5D, a third light source 3E configured to emit third light L5 toward the third reflecting dot group 5E, and a fourth light source 3F configured to emit fourth light L6 toward the fourth reflecting dot group 5F.

Each of the light sources 3C to 3F is constituted by an LED package including a red LED chip (a red light emitting element) configured to emit red light, a green LED chip (a green light emitting element) configured to emit green light, and a blue LED chip (a blue light emitting element) 9 configured to emit blue light. The light sources 3C to 3F radially emit the first light L3, the second light L4, the third light L5 and the fourth light L6 obtained by mixing these colored lights, respectively.

Here, in the light sources 3C to 3F, emission colors of the lights L3 to L6 can be arbitrarily adjusted by mixing these colored lights while controlling a ratio of the red light, the green light and the blue light emitted from the LED chips in the LED package. Accordingly, in the second embodiment, for example, it is possible to perform setting in which the first light source 3C emits yellow light as the first light L3, the second light source 3D emits white light as the second light L4, the third light source 3E emits green light as the third light L5, and the fourth light source 3F emits peach light as the fourth light L6.

In addition, the first light source 3C and the second light source 3D are disposed along the end surface 2a on a lower side in FIG. 9 among the end surfaces 2a of the four sides of the light guide plate 2. The third light source 3E and the fourth light source 3F are disposed along the end surface 2a on a right side in FIG. 9. Accordingly, the lights L3 to L6 emitted from the light sources 3C, 3D, 3E and 3F can enter the light guide plate 2 from the end surfaces 2a thereof.

In the display device 1A of the embodiment, a reflecting direction of the first light L3, that is reflected at each of the reflecting dots 4, with respect to the incidence direction of the first light L3, that enters each of the reflecting dots 4, is controlled such that the first light L3 reflected by the plurality of reflecting dots 4 that constitute the first reflecting dot group 5C is emitted toward a common eye point (not shown in FIG. 9). That is, in the display device 1A of the embodiment, each of the reflecting dots 4 are formed so that reflecting directions of the first light L3, that is reflected at each of the reflecting dots 4, with respect to the incidence direction of the first light L3, that enters each of the reflecting dots 4, is adjusted such that the first light L3 reflected by the plurality of reflecting dots 4 that constitute the first reflecting dot group 5C is emitted toward a common eye point (not shown in FIG. 9).

In addition, in the display device 1A of the embodiment, a reflecting direction of the second light L4, that is reflected at each of the reflecting dots 4, with respect to the incidence direction of the second light L4, that enters each of the reflecting dots 4, is controlled such that the second light L4 reflected by the plurality of reflecting dots 4 that constitute the second reflecting dot group 5D is emitted toward the common eye point. That is, in the display device 1A of the embodiment, each of the reflecting dots 4 are formed so that reflecting directions of the second light L4, that is reflected at each of the reflecting dots 4, with respect to the incidence direction of the second light L4, that enters each of the reflecting dots 4, is adjusted such that the second light L4 reflected by the plurality of reflecting dots 4 that constitute the second reflecting dot group 5D is emitted toward the common eye point.

In addition, in the display device 1A of the embodiment, a reflecting direction of the third light L5, that is reflected at each of the reflecting dots 4, with respect to the incidence direction of the third light L5, that enters each of the reflecting dots 4, is controlled such that the third light L5 reflected by the plurality of reflecting dots 4 that constitute the third reflecting dot group 5E is emitted toward the common eye point. That is, in the display device 1A of the embodiment, each of the reflecting dots 4 are formed so that reflecting direction of the third light L5, that is reflected at each of the reflecting dots 4, with respect to the incidence direction of the third light L5, that enters each of the reflecting dots 4, is adjusted such that the third light L5 reflected by the plurality of reflecting dots 4 that constitute the third reflecting dot group 5E is emitted toward the common eye point.

In addition, in the display device 1A of the embodiment, a reflecting direction of the fourth light L6, that is reflected at each of the reflecting dots 4, with respect to the incidence direction of the fourth light L6, that enters each of the reflecting dots 4, is controlled such that the fourth light 1L6 reflected by the plurality of reflecting dots 4 that constitute the fourth reflecting dot group 5F is emitted to the common eye point. That is, in the display device 1A of the embodiment, each of the reflecting dots 4 are formed so that reflecting direction of the fourth light L6, that is reflected at each of the reflecting dots 4, with respect to the incidence direction of the fourth light L6, that enters each of the reflecting dots 4, is controlled such that the fourth light L6 reflected by the plurality of reflecting dots 4 that constitute the fourth reflecting dot group 5F is emitted to the common eye point.

Meanwhile, the second, third and fourth lights LA, L5 and L6 reflected at the plurality of reflecting dots 4 that constitute the first reflecting dot group 5C are emitted toward positions different from the common eye point. In addition, the first, third and fourth light L3, L5 and L6 reflected by the plurality of reflecting dots 4 that constitute the second reflecting dot group 5D are emitted toward positions different from the common eye point. In addition, the first, second and fourth lights L3, L4 and L6 reflected by the plurality of reflecting dots 4 that constitute the third reflecting dot group 5E are emitted toward positions different from the common eye point. In addition, the first, second and third lights 13, L4 and L5 reflected by the plurality of reflecting dots 4 that constitute the fourth reflecting dot group 5F are emitted toward positions different from the common eye point.

Accordingly, in the display device 1A of the embodiment, the four display patterns P3, P4, P5 and P6 can be visually recognized at the common eye point, and the one image G obtained by superimposing the display patterns P3, P4, P5 and P6 can be visually recognized.

In addition, in the display device 1A of the embodiment, a color display of the image G can be arbitrarily changed by changing the colored lights of the lights L3 to L6 emitted from the light sources 3C to 3F.

In addition, in the display device LA of the embodiment, while not shown, for example, a configuration in which a reflecting dot group constituted by the plurality of reflecting surfaces 4a configured to reflect both of the lights L3 and LA (or the lights L5 and L6) to the common eye point disposed in a region irradiated with both of the lights L3 and L4 from the first and second light sources 3C and 3D (or the lights L5 and L6 from the third and fourth light sources 3E and 3F) disposed along the same end surface 2a may be provided. Accordingly, it is possible to display the display pattern using the mixed color of the lights L3 and L4 (or the lights L5 and L6) from the different light sources 3C and 3D (or the light sources 3E and 3F).

In addition, in the reflecting dots 4 (the reflecting surfaces 4a) configured to reflect the lights L3 and L4 (or the lights L5 and L6) from the different light sources 3C and 3D (or the light sources 3E and 3F) toward the common eye point, a ration of reflected areas of the one light L3 (or the light L5) and the other light L4 (or L6) can be adjusted. Accordingly, an emitted color of the light obtained by mixing colors of the one light 13 (or the light L5) and the other light L4 (or L6) can be changed.

Third Embodiment

Next, as a third embodiment of the present invention, a display device 1B shown in FIG. 10 will be described.

Figure 10:
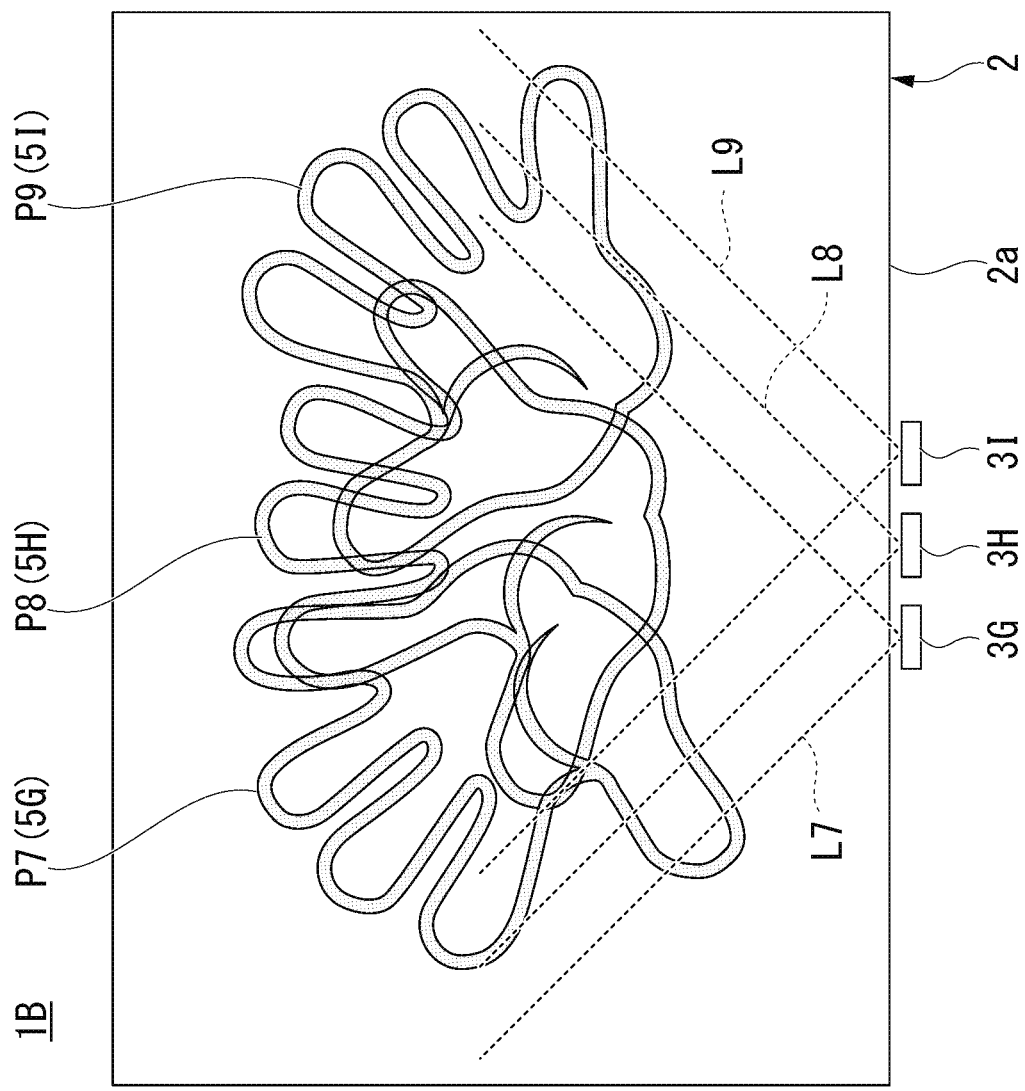
FIG. 10 is a plan view showing a configuration of a display device according to a third embodiment of the present invention.

Further, FIG. 10 is a plan view showing a configuration of the display device 1B. In addition, in the following description, the same components as those of the display device 1 are designated by the same reference numerals and detailed description thereof will be omitted.

As shown in FIG. 10, the display device 1B of the embodiment is configured to display movement (animation) of display patterns P7, P8 and P9 by sequentially deviating and disposing the same three display patterns P7, P8 and P9 in the surface of the light guide plate 2 and sequentially switching displays of the display patterns P7, P8 and P9.

Specifically, a first reflecting dot group 5G constituted by the plurality of reflecting dots 4 (not shown in FIG. 10) that form the first display pattern P7, a second reflecting dot group 5H constituted by the plurality of reflecting dots 4 (not shown in FIG. 10) that form the second display pattern P8, and a third reflecting dot group 5I constituted by the plurality of reflecting dots 4 (not shown in FIG. 10) that form the third display pattern P9 are provided on the back surface 2b of the light guide plate 2.

In addition, the display device 1B includes a first light source 3G configured to emit first light L7 toward the first reflecting dot group 5G, a second light source 3H configured to emit second light L8 toward the second reflecting dot group 5H, and a third light source 3I configured to emit third light L9 toward the third reflecting dot group 5I.

In addition, the first light source 3G, the second light source 3H and the third light source 3I are disposed to be arranged in a state in which they are separated from each other along the common end surface 2a of the light guide plate 2. Accordingly, the light sources 3G, 3H and 3I radially emit the first light L7, the second light L8 and the third light L9 from different positions, respectively. In addition, the first light L7, the second light L8 and the third light L9 have the same colored light.

In the display device 1B of the embodiment, a reflecting direction of the first light L7, that is reflected by the reflecting dots 4, with respect to the incidence direction of the first light L7, that enters the reflecting dots 4, is controlled such that the first light L7 reflected by the plurality of reflecting dots 4 that constitute the first reflecting dot group 5G is emitted toward the common eye point (not shown in FIG. 10). That is, in the display device 1B of the embodiment, each of the reflecting dots 4 are formed so that reflecting direction of the first light L7, that is reflected by the reflecting dots 4, with respect to the incidence direction of the first light L7, that enters the reflecting dots 4, is adjusted such that the first light L7 reflected by the plurality of reflecting dots 4 that constitute the first reflecting dot group 5G is emitted toward the common eye point (not shown in FIG. 10)

In addition, in the display device 1B of the embodiment, a reflecting direction of the second light L8, that is reflected by the reflecting dots 4, with respect to the incidence direction of the second light L8, that enters the reflecting dots 4, is controlled such that the second light L8 reflected by the plurality of reflecting dots 4 that constitute the second reflecting dot group 5H is emitted toward the common eye point. That is, in the display device 1B of the embodiment, each of the reflecting dots 4 are formed so that reflecting direction of the second light L8, that is reflected by the reflecting dots 4, with respect to the incidence direction of the second light L8, that enters the reflecting dots 4, is adjusted such that the second light L8 reflected by the plurality of reflecting dots 4 that constitute the second reflecting dot group 5H is emitted toward the common eye point.

In addition, in the display device 1B of the embodiment, a reflecting direction of the third light L9, that is reflected by the reflecting dots 4, with respect to the incidence direction of the third light L9, that enters the reflecting dots 4, is controlled such that the third light L9 reflected by the plurality of reflecting dots 4 that constitute the third reflecting dot group 5I is emitted toward the common eye point. That is, in the display device 1B of the embodiment, each of the reflecting dots 4 are formed so that reflecting direction of the third light L9, that is reflected by the reflecting dots 4, with respect to the incidence direction of the third light L9, that enters the reflecting dots 4, is adjusted such that the third light L9 reflected by the plurality of reflecting dots 4 that constitute the third reflecting dot group 5I is emitted toward the common eye point.

Meanwhile, the second and third lights L8 and L9 reflected by the plurality of reflecting dots 4 that constitute the first reflecting dot group 5G are emitted toward positions different from the common eye point. In addition, the first and third lights L7 and L9 reflected by the plurality of reflecting dots 4 that constitute the second reflecting dot group 5H are emitted toward positions different from the common eye point. In addition, the first and second lights L7 and L8 reflected by the plurality of reflecting dots 4 that constitute the third reflecting dot group 5I are emitted toward positions different from the common eye point.

Accordingly, in the display device 1B of the embodiment, the above-mentioned three display patterns P7, P8 and P9 can be visually recognized at the common eye point. In addition, movement (animation) of the display patterns P7, P5 and P9 can be visually recognized while sequentially switching displays of the display patterns P7, P8 and P9 by sequentially switching lighting of the light sources 3G, 3H and 3I.

Further, the present invention is not particularly limited to the embodiment and various modifications may be made without departing from the scope of the present invention.

For example, regarding the end surface 2a of the light guide plate 2 facing the light sources 3A to 3I, it may be configured as a lens surface (a cylindrical surface) and a configuration in which the lights L1 to L9 emitted from the light sources 3A to 3I enter the light guide plate 2 while being condensed in a thickness direction of the light guide plate 2 may be provided.

In addition, while the configuration in which the light source 3A to 3I are disposed to face the end surface 2a of the light guide plate 2 is provided, a configuration in which the light source 3A to 3I are disposed parallel to the in-plane surface of the light guide plate 2 and the lights L1 to L9 emitted from the light source 3A to 3I enter the end surface 2a of the light guide plate 2 via a reflector may be provided.

Further, in the display device 1, 1A or 1B, for example, in a game machine such as a pinball machine, a pinball slot machine, or the like, the light guide plate 2 is disposed on a front surface of a display screen such as a liquid crystal display panel or the like, and can be used for visual recognition of a display pattern displayed on the light guide plate 2 separately from an image displayed on a display screen.

In addition, the display device to which the present invention is applied is not limited to the above-mentioned game machine, and the display device of the present invention can be widely applied with respect to a use to which the display device of the present invention is applicable.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A display device comprising:
   a light guide plate that includes a plurality of reflecting dots; and
   a light source disposed along an end surface of the light guide plate,
   wherein light emitted from the light source enters inside of the light guide plate from the end surface of the light guide plate and the light is guided inside of the light guiding plate,
   a display pattern formed by the plurality of reflecting dots is displayed by emitting the light reflected by the plurality of reflecting dots to an outside from a front surface side of the light guide plate, and
   each of the reflecting dots are provided at a back surface side of the light guide plate and are formed such that a reflecting direction of the light, that is reflected by the reflecting dots, with respect to an incidence direction of the light, that enters the reflecting dots, is adjusted so that the light reflected by the plurality of reflecting dots is emitted toward a specific eye point at which the display pattern is visually recognized by a viewer.

2. The display device according to claim 1, comprising:
   a first reflecting dot group constituted by the plurality of reflecting dots that form a first display pattern;
   a second reflecting dot group constituted by the plurality of reflecting dots that form a second display pattern;
   a first light source configured to emit first light toward the first reflecting dot group; and
   a second light source configured to emit second light toward the second reflecting dot group,
   wherein the first light reflected by the plurality of reflecting dots that constitute the first reflecting dot group is emitted toward the eye point, and
   the second light reflected by the plurality of reflecting dots that constitute the second reflecting dot group is emitted toward the eye point.

3. The display device according to claim 2, wherein the second light reflected by the plurality of reflecting dots that constitute the first reflecting dot group is emitted toward a position different from the eye point, and
   the first light reflected by the plurality of reflecting dots that constitute the second reflecting dot group is emitted toward a position different from the eye point.

4. The display device according to claim 2, wherein a first pattern forming region that forms the first display pattern and a second pattern forming region that forms the second display pattern at least partially overlap each other in a surface of the light guide plate.

5. The display device according to claim 4, comprising a composite dot in which end portions of the first reflecting dot and the second reflecting dot, which are adjacent to each other, butt against each other, among the plurality of reflecting dots that constitute the first reflecting dot group and the plurality of reflecting dots that constitute the second reflecting dot group in a region in which the first pattern forming region and the second pattern forming region overlap each other.

6. The display device according to claim 1, wherein colored lights of the first light and the second light are different from each other.

7. The display device according to claim 1, wherein the plurality of reflecting dots have reflecting surfaces configured to reflect light from the light source, and
   an orientation of the reflecting surfaces in the surface of the light guide plate is set at each of the reflecting dots such that the light reflected by the plurality of reflecting dots is emitted toward the eye point.

8. The display device according to claim 7, wherein the reflecting surfaces have a shape extending in a direction crossing an incidence direction of the light entering the reflecting surfaces when the light guide plate is seen from a front surface side in a plan view.

9. The display device according to claim 8, wherein the reflecting surfaces have a shape curved toward a side in which light from the light source enters the reflecting surfaces when the light guide plate is seen from the front surface side in a plan view.

10. The display device according to claim 8, wherein the reflecting dot is constituted by a concave section provided in a back surface of the light guide plate, and
   the concave section comprises an inclined surface that forms the reflecting surface.

11. The display device according to claim 1, wherein the light source comprises a plurality of light emitting elements configured to emit different colored lights.

12. The display device according to claim 11, wherein the light source mixes and emits different colored lights emitted from the plurality of light emitting elements.

* * * * *